(12) United States Patent
Richmond et al.

(10) Patent No.: US 9,067,435 B2
(45) Date of Patent: Jun. 30, 2015

(54) COUPLING OF DIGITAL PRINTER AND FINISHING

(71) Applicant: ELECTRONICS FOR IMAGING, INC., Foster City, CA (US)

(72) Inventors: Scott Richmond, Foster City, CA (US); Joe Evanko, Dearborn, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 14/022,035

(22) Filed: Sep. 9, 2013

(65) Prior Publication Data

US 2014/0071195 A1 Mar. 13, 2014

Related U.S. Application Data

(60) Provisional application No. 61/699,215, filed on Sep. 10, 2012.

(51) Int. Cl.
| | |
|---|---|
| *B41J 29/393* | (2006.01) |
| *B41J 11/00* | (2006.01) |
| *B41J 11/46* | (2006.01) |
| *B41J 15/00* | (2006.01) |

(52) U.S. Cl.
CPC .............. *B41J 11/0015* (2013.01); *B41J 11/46* (2013.01); *B41J 15/005* (2013.01)

(58) Field of Classification Search
None
See application file for complete search history.

(56) References Cited

U.S. PATENT DOCUMENTS

| | | | | |
|---|---|---|---|---|
| 8,029,083 B2 * | 10/2011 | Yamada | ........................... | 347/16 |
| 8,083,343 B2 * | 12/2011 | Ikuno et al. | ................... | 347/105 |
| 8,690,276 B2 * | 4/2014 | Moore | .............................. | 347/8 |

* cited by examiner

*Primary Examiner* — Lamson Nguyen
(74) *Attorney, Agent, or Firm* — Michael A. Glenn; Perkins Coie LLP

(57) ABSTRACT

Various disclosed embodiments relate to structures and methods for printing systems. In some embodiments, a device, e.g., a festoon, may be used to accumulate excess material. The festoon may be located between a print head and a finishing component to eliminate misalignment/mis-registration difficulties between printed images and finishing options. In some embodiments, registration images and other procedures may be used alone or in conjunction with the festoon placement to further reduce errors and waste.

9 Claims, 17 Drawing Sheets

COUPLING OF DIGITAL PRINTER AND FINISHING

CROSS-REFERENCE TO RELATED APPLICATIONS

This application claims priority to and the benefit of U.S. Provisional Application 61/699,215, entitled COUPLING OF DIGITAL PRINTING AND FINISHING, filed on Sep. 10, 2012.

BACKGROUND

Printing systems often handle large orders requiring the production of many thousands of articles in a short period. Accordingly, if the system produces even a slight error or minor wasteful addition with each printing, the cumulative effect may significantly increase the cost and time required to achieve the desired result. Human operators may themselves introduce errors or be incapable of recognizing the finely tuned adjustments required to efficiently produce a product.

Accordingly, there exists a need for printer systems which minimize waste and which take as full advantage of the provided resources as possible. Additionally, there is a need for software and methods which economize the production of printed items.

BRIEF DESCRIPTION OF THE DRAWINGS

One or more embodiments of the present disclosure are illustrated by way of example and not limitation in the accompanying figures, in which like references indicate similar elements.

Figure 1:
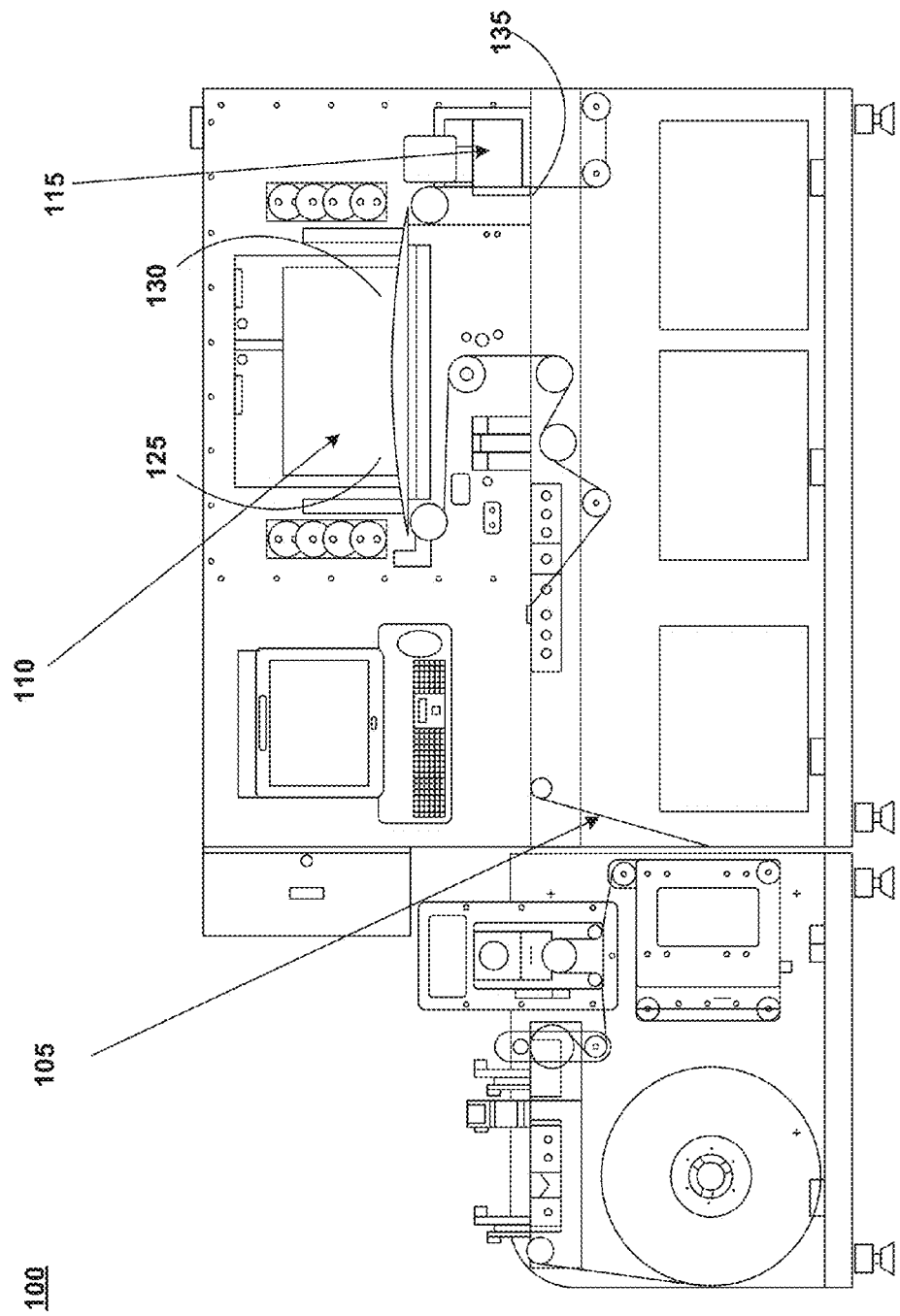
FIG. 1 is a schematic layout of certain components in a printer as may be implemented in some embodiments.

Those skilled in the art will appreciate that the logic illustrated in each of the flow and sequence diagrams discussed herein may be altered in a variety of ways. For example, the order of the logic may be rearranged, sub-blocks may be performed in parallel, illustrated logic may be omitted, other logic may be included, etc. The depicted examples are provided in the depicted manner merely for purposes of explanation and for the convenience of the reader.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Printer System Overview

Various disclosed embodiments relate to printer systems as well as software and methods for their operation. In particular, some embodiments contemplate printer designs wherein a festoon is located at one of several possible positions to reduce the wasteful generation of paper.

FIG. 1 is a schematic layout of components in a printer 100 as may be implemented in some embodiments. A substrate material 105 to be printed upon may pass through a print head area 110 of the printer system. The print head area 110 may include a beginning portion 125 an end portion 130 and an end of curing zone 135. An ink curing device 115 may also be included for processing the ink.

Some digital printers require very precise drop placement to produce a high quality image. In some single-pass digital printing applications the substrate material 105 moves while the printheads 110 themselves remain stationary. A printer using curable ink(s) may require the ink to be "dried" or "cured" to the substrate material. The ink may be a liquid when jetted from the printhead. During the curing the ink adheres/solidifies to the substrate material. A curing lamp may be placed at some distance after the printheads, e.g. in the curing zone before the end 135 to provide the desired heat.

Figure 2:
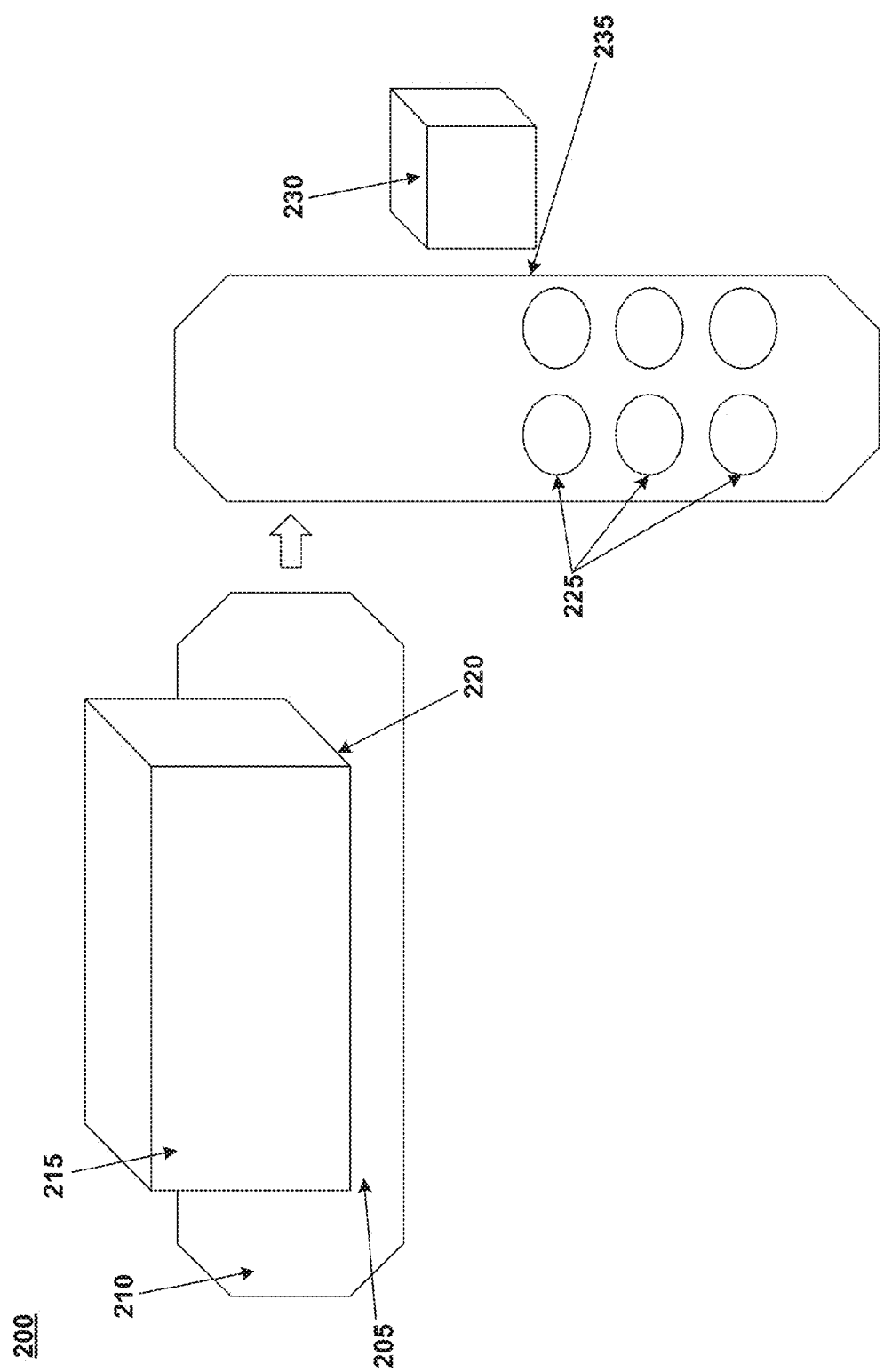
FIG. 2 is a schematic layout of certain components in a printer as may be implemented in some embodiments.

FIG. 2 is a schematic layout of certain components in a printer as may be implemented in some embodiments. Printheads in printhead area 215 may eject ink upon top portion 210 of the substrate material to produce an example printed image 225. A distance D may stretch from the beginning 205 of the printheads to the ending 220. The cure zone may end at position 235 and an ink curing device 230 may be located a distance from the material to deliver the proper amount of heat.

The curing lamp may be placed at some distance after the printheads. As a consequence, when printing is completed or when the transport is stopped, the substrate material may continue to be transported through the curing section 235 so that the last printed image/copy of a job will be cured. The linear distance between end portion 130 and ink curving device 115 illustrates the distance from the printheads to curing zone end position 235. When printing is restarted, the system may create a portion of unprinted substrate material between the end of the last print and the start of the new print.

This unprinted material may be wasteful and may be unwanted partially due to the material cost. The existence of unprinted material in between printed and cured images may also be a problem for label applicator machines as the applicator machines may expect labels to be in certain locations.

Festoon/Buffer

Figure 3:
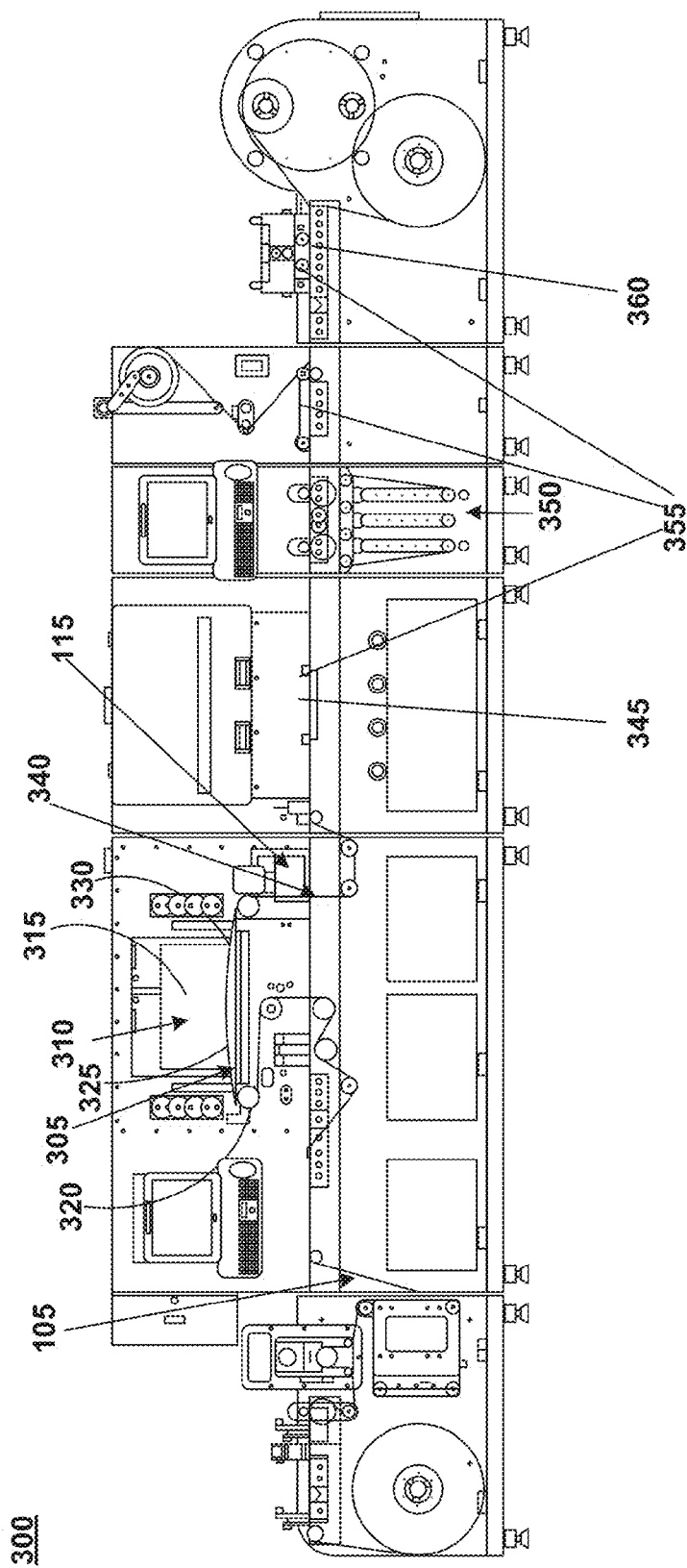
FIG. 3 is a schematic layout of certain components in a printer depicting a first location of a festoon as may be implemented in some embodiments.

FIG. 3 is a schematic layout of certain components in a printer depicting a first location of a material accumulating structure (referred to herein as "festoon" or "buffer" in some embodiments) as may be implemented in some embodiments. In some embodiments, a festoon/buffer 350 may be placed after the printing and curing stations to allow the substrate material to accumulate as the final print is transported through the cure lamp. The accumulated material may then return backwards through the cure lamp and print zone such that the final printed image of the previous sequence resides at a known location prior to the printhead area. This allows the system to resume printing from the previous location and thereby reduce the production of wasted substrate.

Festoon/Buffer Sequence of Operation

The printer system may generate a signal when printing is completed at the end of printhead area 315. This signal may inform the transport control system to begin a festoon accumulation and return process. When the printing is completed the print hardware notifies the transport control system. At this point in time the transport control may manage the material to ensure it is cured and returned to the correct position. This may be accomplished through a hard wired connection, but can also be performed via other control methods. In some embodiments, the substrate within the buffer and prior to the buffer continues to move in a forward direction for a minimum of the distance from printhead area 315 to the end of the cure zone 340 as shown. This allows the last image of a job to be cured. When the buffer has completed the accumulation of material, the transport reverses direction and the printed and cured material travels backward through the cure zone 340 and print head zone 315 to a point prior to the beginning of the printheads 305. The buffer/festoon height can be set to allow for a variable distance from the beginning 325 of the printheads section to the end 330 of the printheads section.

In some embodiments, finishing options, e.g. laser finishing component 345, slitting component 360, or matrix removal may be incorporated inline with the printing operations. "Matrix" as referenced herein may refer to waste or unwanted material outside of the cut region that can be removed, e.g. by peeling off. In some embodiments, the festoon is placed in a linear position aft of the printheads 310 and finishing components as indicated in FIG. 3. The embodiment shown in FIG. 3 is a laser finishing component 345 inline between printheads 310 and festoon 350. In the depicted example configuration the festoon 350 is placed aft of the laser finishing but before the matrix removal and slitting. Alternative or additional finishing components than laser finishing component 345 may be included in some embodiments.

Unfortunately, in some instances, having a laser finishing component 345 situated between printheads 310 and festoon 350 causes synchronization errors when the printing resumes following a stop. Issues may also arise as a consequence of other finishing options 355. During the web return process the laser cutting process may be paused leaving labels in the laser window partially cut. When the web returns to the original position the cutting is resumed but a small error can be observed. This error is visible on the final label and can cause issues with matrix removal and other downstream processes.

Festoon/Buffer—Second Position

Figure 4:
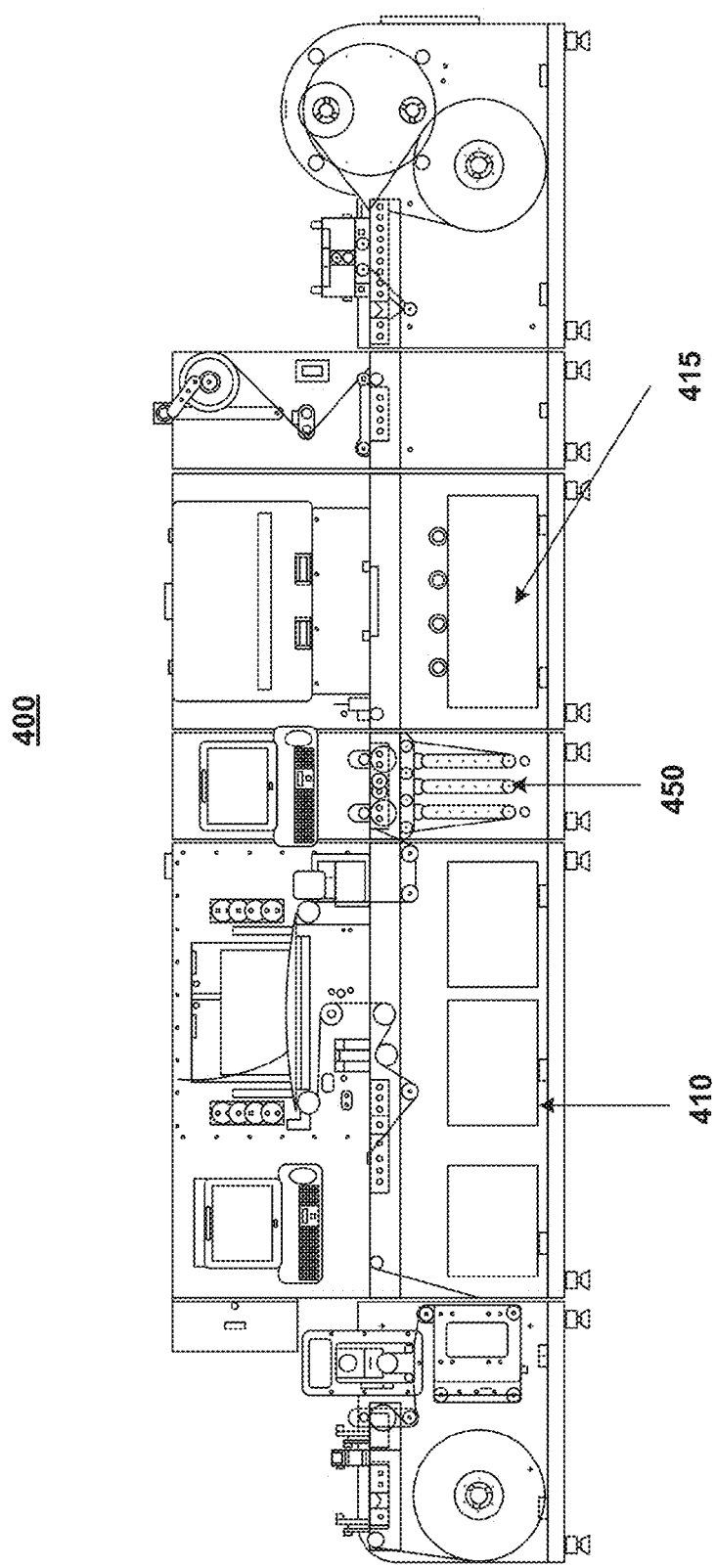
FIG. 4 is a schematic layout of certain components in a printer depicting a second location of a festoon as may be implemented in some embodiments.

Certain embodiments contemplate relocation of the festoon to avoid some of the above-described errors. For example, FIG. 4 is a schematic layout of certain components in a printer 400 depicting a second location of a festoon 450 as may be implemented in some embodiments. Moving the festoon 450 to a position between a printing section 410 and finishing section 415 may allow optimization of processes that go in one direction. Some embodiments contemplate a laser finishing application within finishing section 415 located after a printing section 410 and festoon 450. In this position the substrate material may either be stopped or continue in a forward direction through the laser. Additionally, because the festoon 450 is closer to the printing section 410 the finishing application within finishing section 415 may apply many different additional finishing applications.

Figure 5:
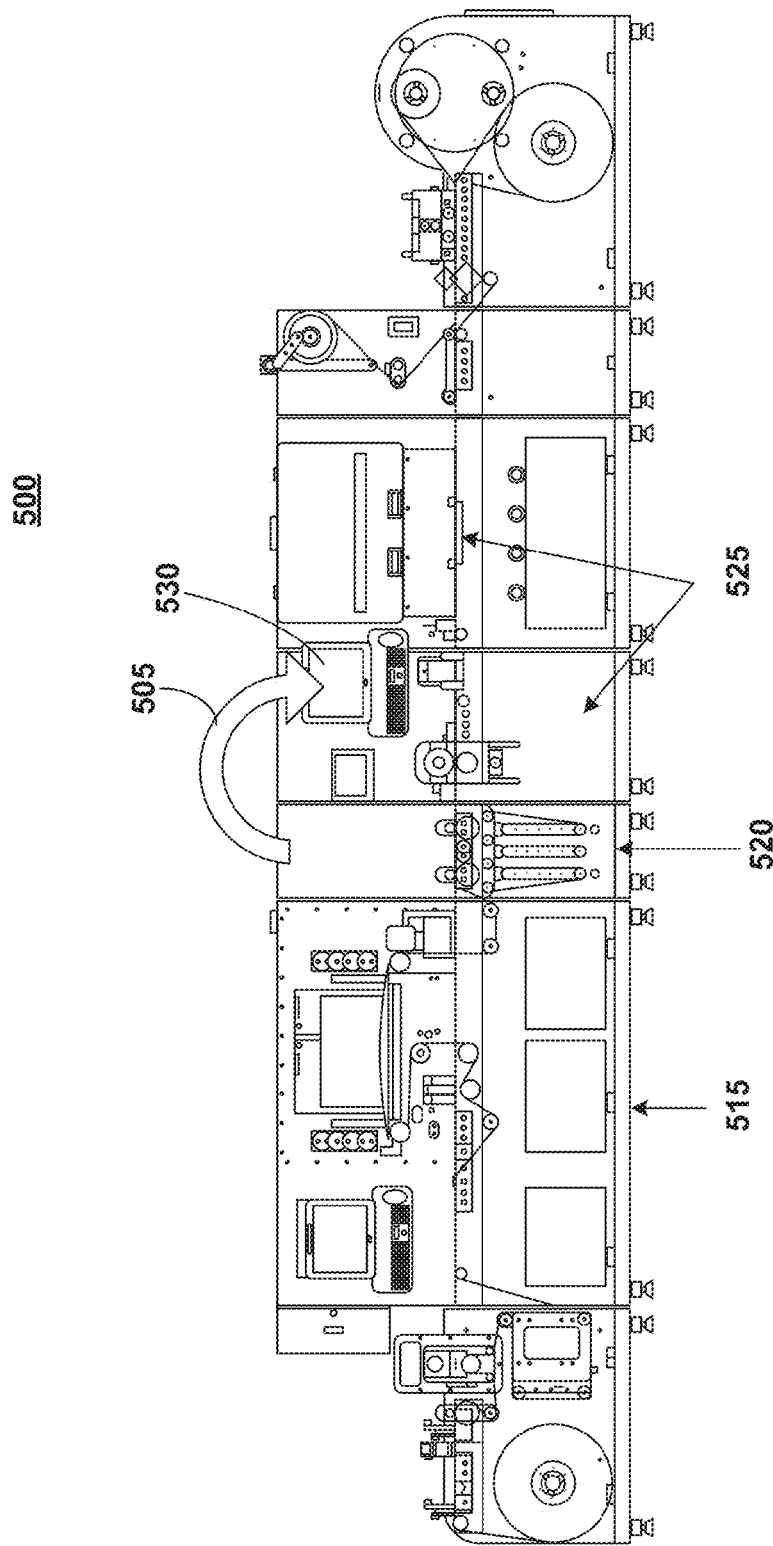
FIG. 5 is a schematic layout of certain components in a printer depicting the relation between the festoon and finishing operations.

FIG. 5 is a schematic layout of certain components in a printer 500 depicting the relation between the festoon 520 and finishing applications 525. In some embodiments, a lamination or varnish station 530 may be included among the finishing applications 525. Backing up or reversing of the substrate material through a lamination or varnish station may lead to complications in re-registering the lamination or varnish application in a seamless transition from where the application process left off prior to the reverse motion.

In some embodiments, because the festoon is located after, for example, the laser and printing section 515, adding a lamination or varnish station may not be co-located. For example, although the substrate material may be able to go both forward and backward in some finishing applications, in many finishing applications uni-directional material motion prevents misregistration or misalignment when forward motion resumes. In some of these applications, finishing processes, such as the laser cutting, must be stopped and resumed seamlessly when the material returns to its last position. If the material is moved forwards and backwards then the position may be more difficult to track due to material deformation or encoding errors. Accordingly, the lamination/varnishing finishing component 530 may be relocated 505 as indicated.

Figure 6:
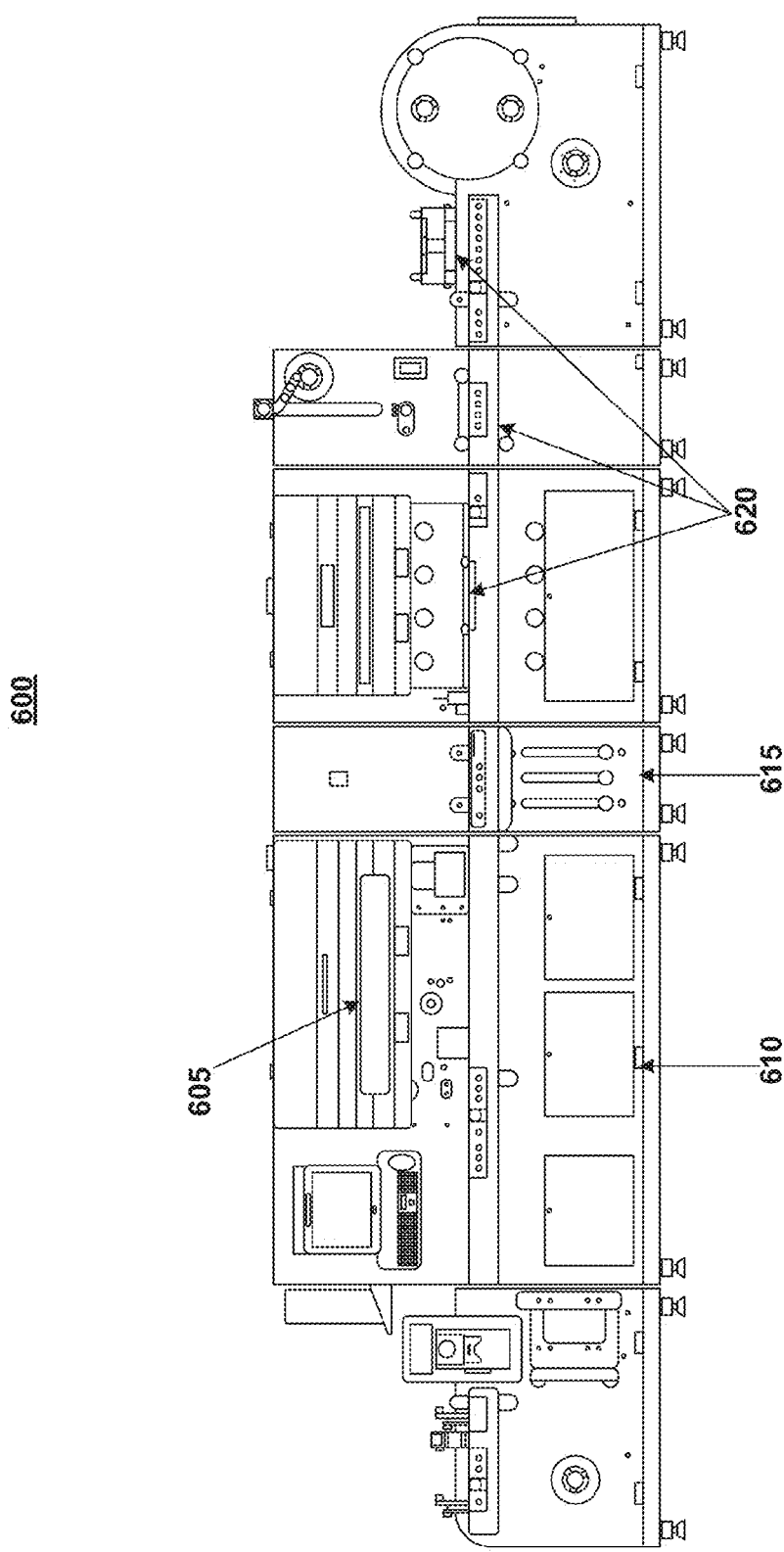
FIG. 6 is an outside, enclosed perspective of the layout of FIG. 4.

FIG. 6 is an outside, enclosed perspective 600 of the layout of FIG. 4. As indicated, the printing system may include finishing applications 620, festoon/buffer 615, printing section 610, and print head location 605. In some embodiments, the festoon is located prior to a finishing application in matrix removal. Matrix removal may include the process of peeling off or removing the leftover substrate area around the printed and cut image. Maintaining stationary or forward motion through the matrix removal region may prevent the substrate from accumulating and sticking to unwanted areas. Accordingly, in some embodiments, placement of the festoon at the location indicated in FIGS. 4-6 may make it unnecessary to move the substrate backward.

Some embodiments apply a slitting operation. In these embodiments, slitting knives are used to cut the substrate into columns or rows to split up rolls of images. Backing up the web through this region causes difficulty in re-registration of the slitted material, either damaging the images printed or leaving unslitted regions leading to tearing or stretching of the substrate material for example.

Cutting Integration

Figure 7:
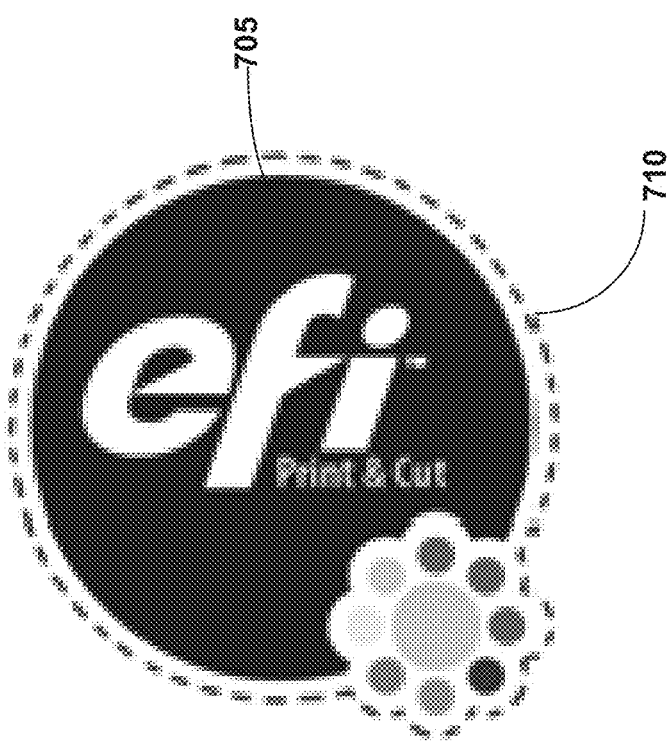
FIG. 7 illustrates an example cut path around an image as may be applied in some embodiments.

FIG. 7 illustrates an example cut path 710 around an image 705 as may be applied in some embodiments. In some embodiments, printing and cutting are separate processes and will be registered together, e.g., the two processes may be aligned together such that the cut outlines the printed area. Printing and cutting may occur in two separate steps. During initial setup the cutting process can be aligned manually, which may create waste as a consequence of human error. For example, distances may be unknown to the human operator due to material thickness or machine configuration.

In contrast, by automating the print to finishing registration the first printed label can be finished accurately. This eliminates waste and allows for multiple print and finish combinations to be run continuously without stopping for setup. The automation also reduces operator errors in setup such as label orientation, number of rows repeat distance, and process direction spacing which can now be predetermined.

Figure 8:
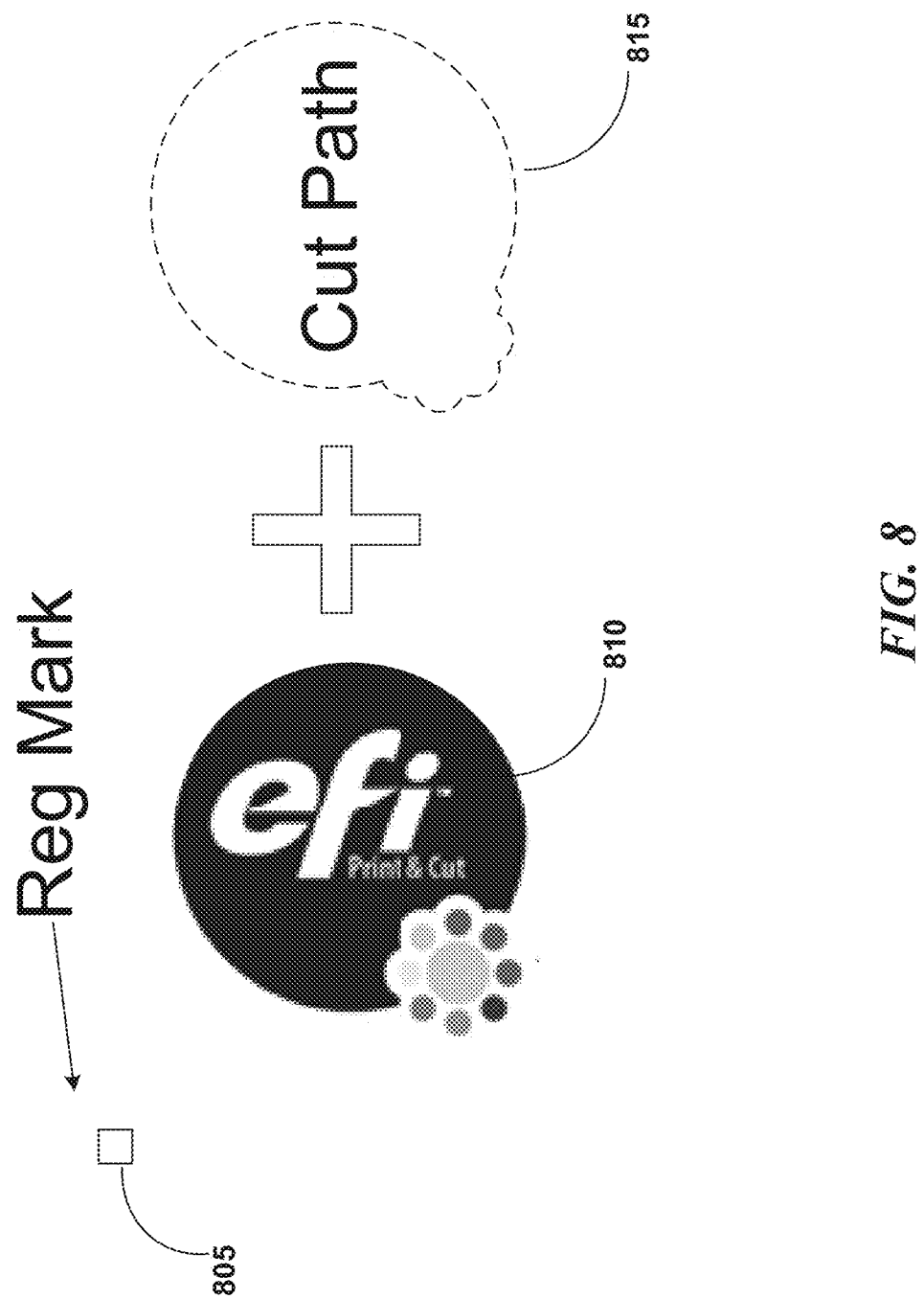
FIG. 8 illustrates an example cut path in relation to an image and a registration mark as may be applied in some embodiments.

FIG. 8 illustrates an example cut path 815 in relation to an image 810 and a registration mark 805 as may be applied in some embodiments. During the Raster Image Process (RIP) a 4 mm registration mark 805 may be added to the printed image. The mark may provide the finishing module with a reference point. The X-Y placement of the registration mark may be determined by the job specific cut contour. In some embodiments a 4×4 mm cyan mark may be used for laser cut sensing, a 4×4 mm magenta mark may be used for web return sensing, and a 4×10 mm cyan mark may be used for indicating the end of job in a continuous queue. One will recognize these marks as examples and that variations will be possible. In some embodiments, the system may first determine if the image to be printed contains colors associated with the mark (e.g., a cyan or magenta color). If the image color is sufficiently similar to a mark color, the system may select an alternative color, shape, or icon, for use for mark registration.

Figure 9:
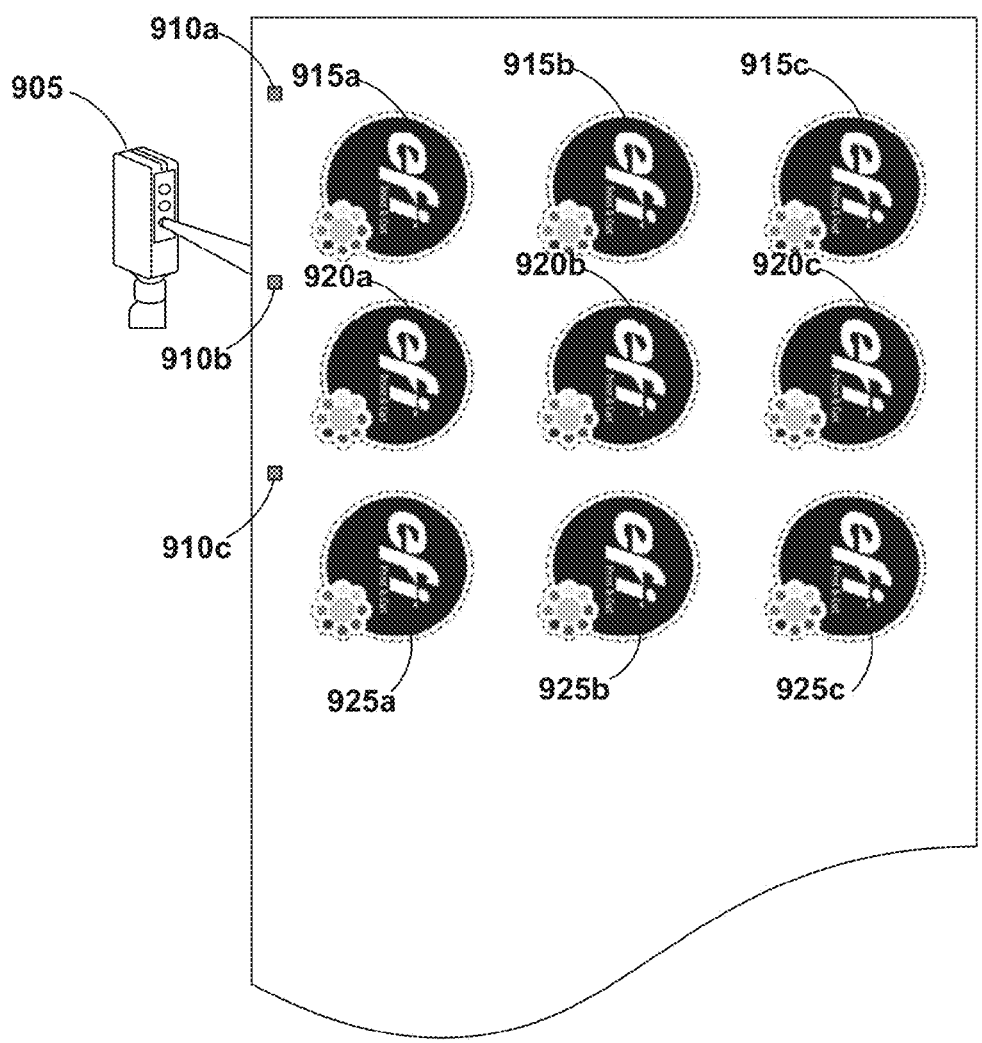
FIG. 9 illustrates an example relation between the registration marks of a pattern and an image sensor as may be applied in some embodiments.

FIG. 9 illustrates an example relation between the registration marks 910a-c of a pattern and an image sensor 905 as may be applied in some embodiments. The image facilitates accurate placement of the first cut for each image set 915a-c, 920a-c, and 925a-c. For example, when the job is created there may be a known location of the cut position relative to the print origin. The mark itself may comprise a cyan indication in the upper left corner. The image sensor may locate this mark and the cut can be placed relative to this position. Additionally, the registration marks 910a-c may be created in a content-aware manner. For example if an image contained a large field near the mark location a magenta mark would be inserted for registration. Reserving a section of the printing area for mark registration may reduce the overall print width. In some embodiments, the use of the mark and the festoon/buffer may collectively serve to greatly improve the printer system's efficiency and substrate economy.

Figure 10:
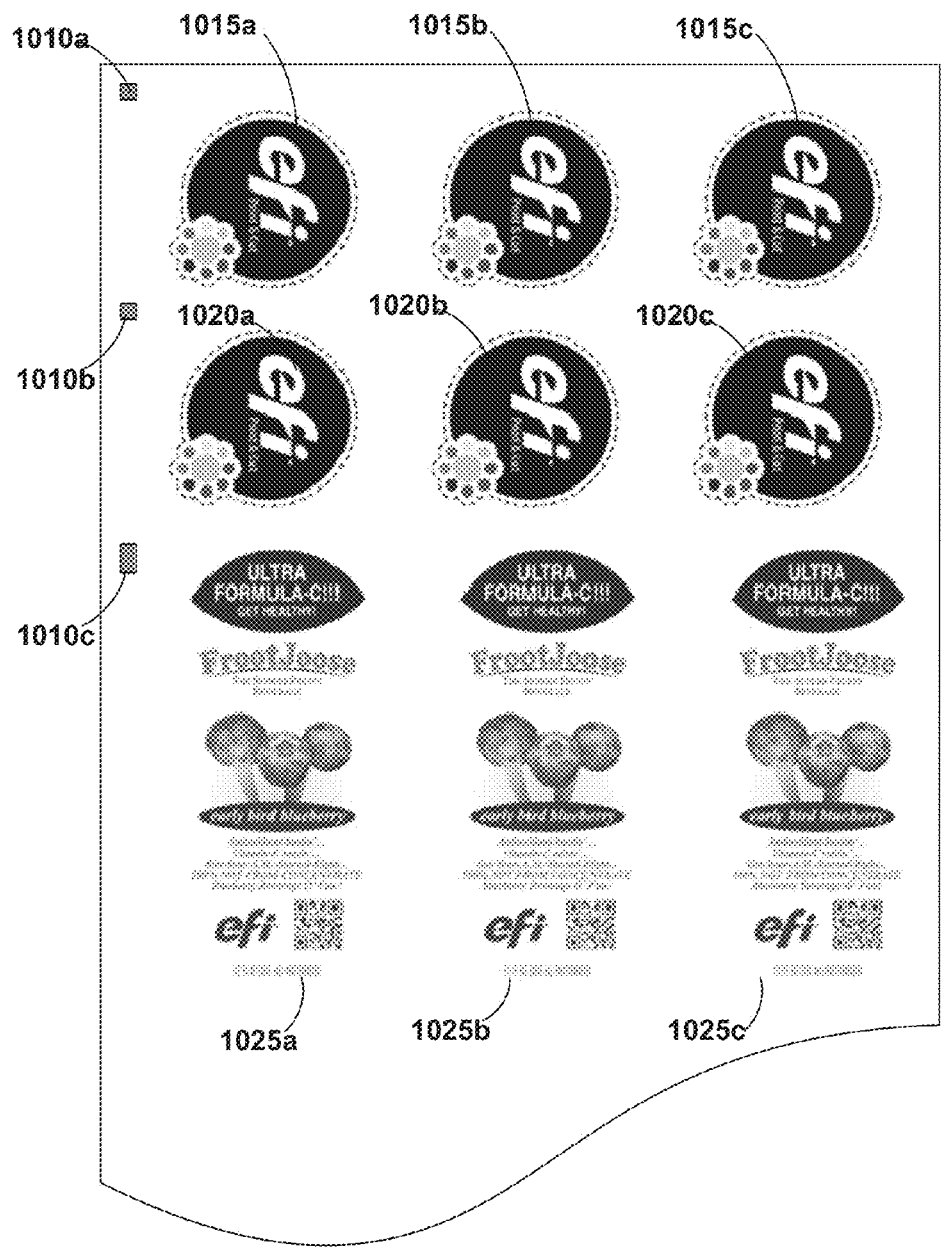
FIG. 10 illustrates a plurality of changing image patterns and their corresponding registration marks as may be implemented in some embodiments.

FIG. 10 illustrates a plurality of changing image patterns 1015a-c, 1020a-c, 1025a-c, and their corresponding registration marks 1010a-c as may be implemented in some embodiments. Registration marks may also be used to indicate job changes (for example, a double length mark 1010c). In this manner, changes may be made on the fly during the printing and finishing processes.

Shorter run lengths often require more material changes. Each material may require machine specific settings for optimal print and finishing performance. To reduce set up time and eliminate waste these parameters can be recorded and easily recalled in a media library for printing and finishing. Digital printing and finishing can be two separate processes. Media specific parameters can be maintained locally at each machine. Operators can be required to enter job specific information at each stage of finishing or to manually determine settings during a set up process.

In some embodiments, the media is selected during the RIP. This setting can be communicated to each module through the use of a job ticket to allow media specific adjustments to be made. Each module may contain a media specific library that contains adjustment parameters. When the job is run each module may update its key parameters based on the current media selection. Automatic parameter adjustment may eliminate the setup step thus eliminating waste and setup time.

Some embodiments further consider adjusting the encoder resolution to accommodate material thickness. A maximum transport speed may also be selected based on image resolution or number of channels printed. A UV lamp intensity may automatically be selected for thermal stability and appropriate tension settings may be determined.

Cut Contour Selection for Multiple Lasers

Figure 11:
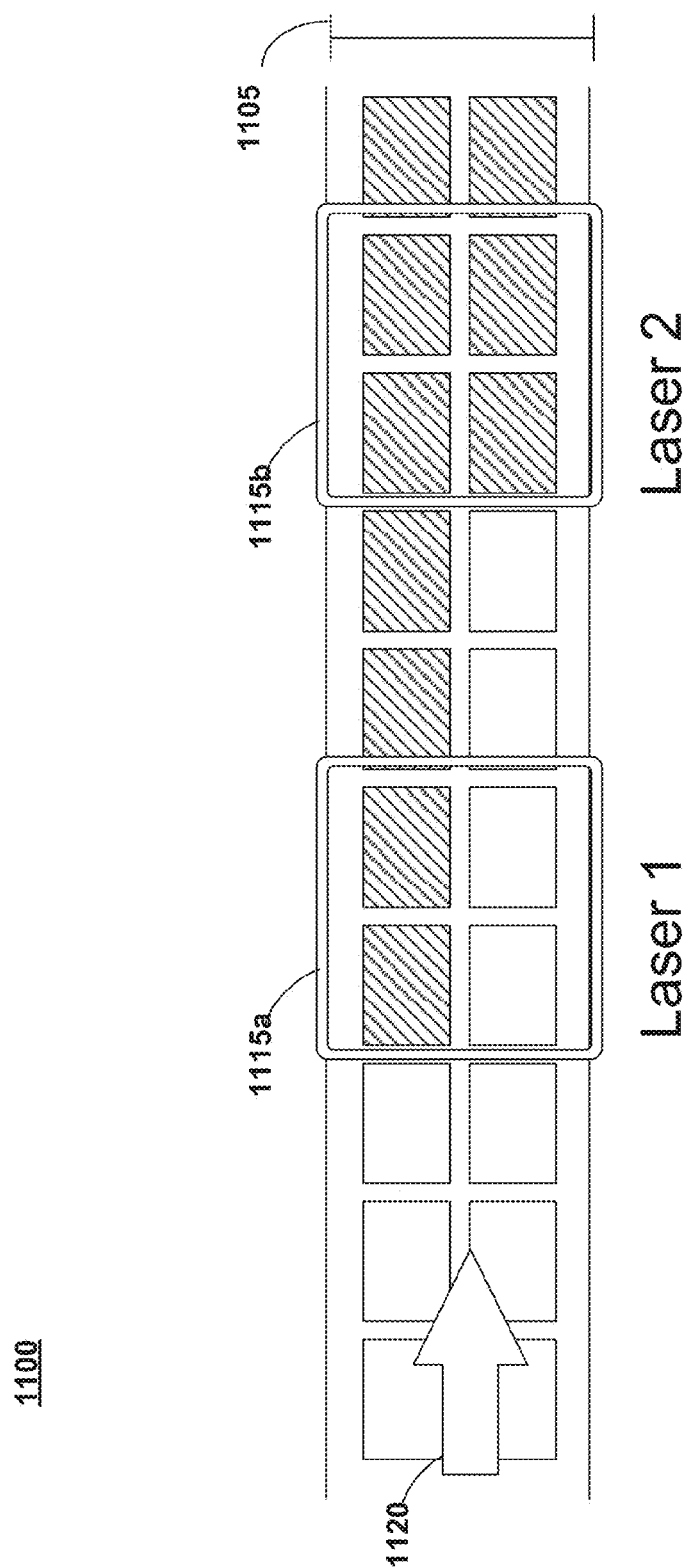
FIG. 11 illustrates an example laser path arrangement as may be implemented in some embodiments.

FIG. 11 illustrates an example laser path arrangement 1100 as may be implemented in some embodiments. To increase machine throughput multiple lasers can be placed inline to distribute the cutting load. This configuration can allow for increased web speeds and redundant cutting in the event of a single laser fault.

Traditionally the method of sharing the laser load can be based on alternating cutting of rows. For example, various sections may be prepared with paths for a first laser 1115a and a second laser 1115b. The material may travel in the direction 1120. If the assigned object spans the entire web width 1105, the cut profile can be viewed as a single row and can be cut with only one laser. It may not be desirable to split a single object between multiple lasers as the starting and ending point between the two lasers may not be flawless.

By adding the ability to manually assign a laser to a specific object within a cut contour the overall process speed can be increased. This assignment can be done during the prepress process or on the machine after the job is loaded. In prepress, each shape can be associated with a number of parameters, e.g., the ability to assign a laser to that shape. These parameters may all be stored in a single file that is transferred to the printer. In some embodiments, a GUI may be provided to the machine operator which allows the operator to perform the same action as prepress, but without permanently altering the job.

Cut Contour Selection for Multiple Lasers—Laser Assignment

Figure 12:
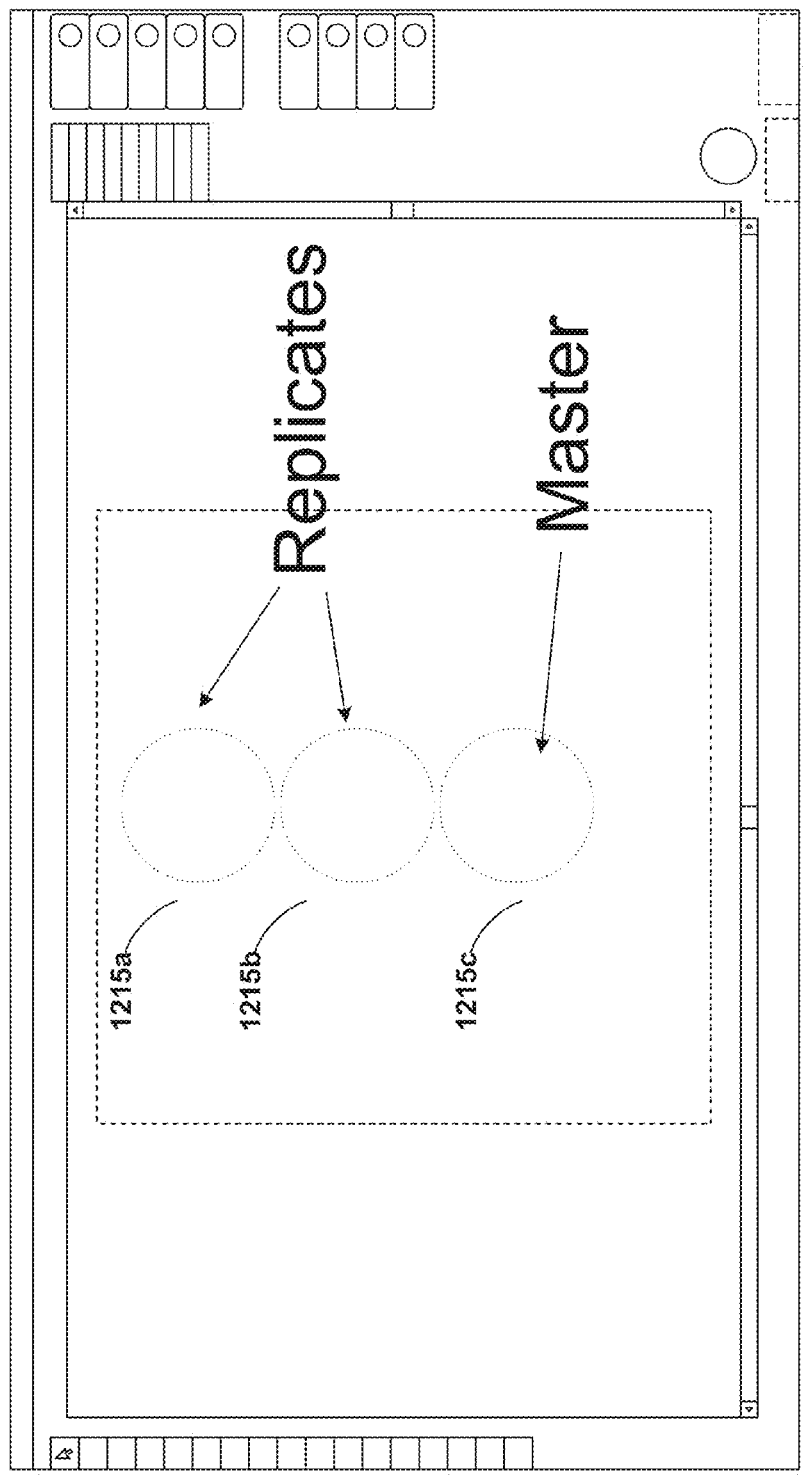
FIG. 12 is a screenshot of a user interface for laser assignment as may be implemented in some embodiments.

FIG. 12 is a screenshot of a user interface for laser assignment as may be implemented in some embodiments. The interface depicted in this example displays a graphical representation of what shape will be cut, as well as template information 1215a-c regarding the cutting parameters. The interface also provides operator feedback on the health of various components.

Figure 13:
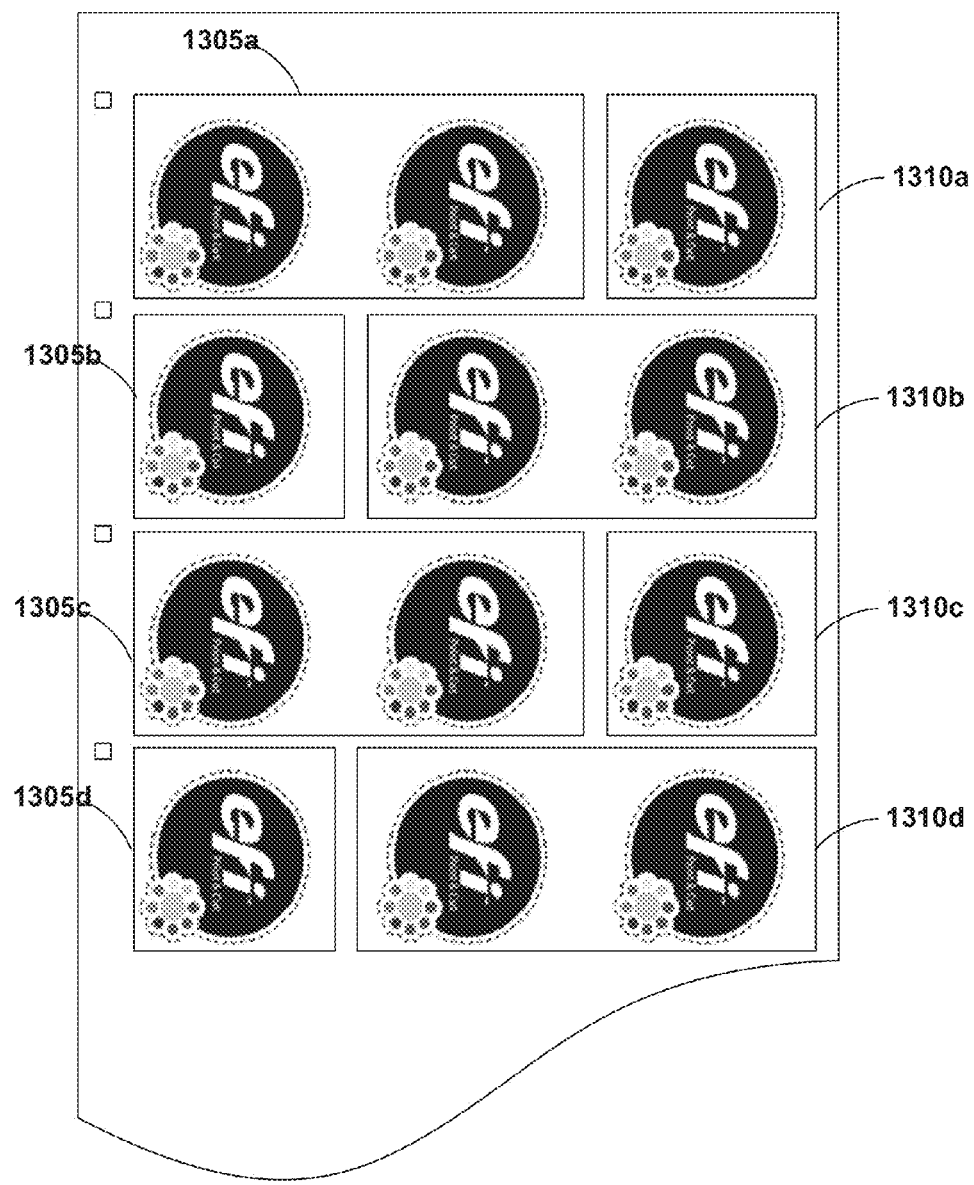
FIG. 13 illustrates the laser assignments as may be applied to a group of images using the interface of FIG. 12.

FIG. 13 illustrates the laser assignments to a first laser 1305a-d and a second laser 1310a-d as may be applied to a group of images using the interface of FIG. 12. In some embodiments, shapes can be chosen individually or in groups when assigning to specific lasers.

Cut Contour Selection for Multiple Lasers—Laser Assignment with Perforation

Figure 14:
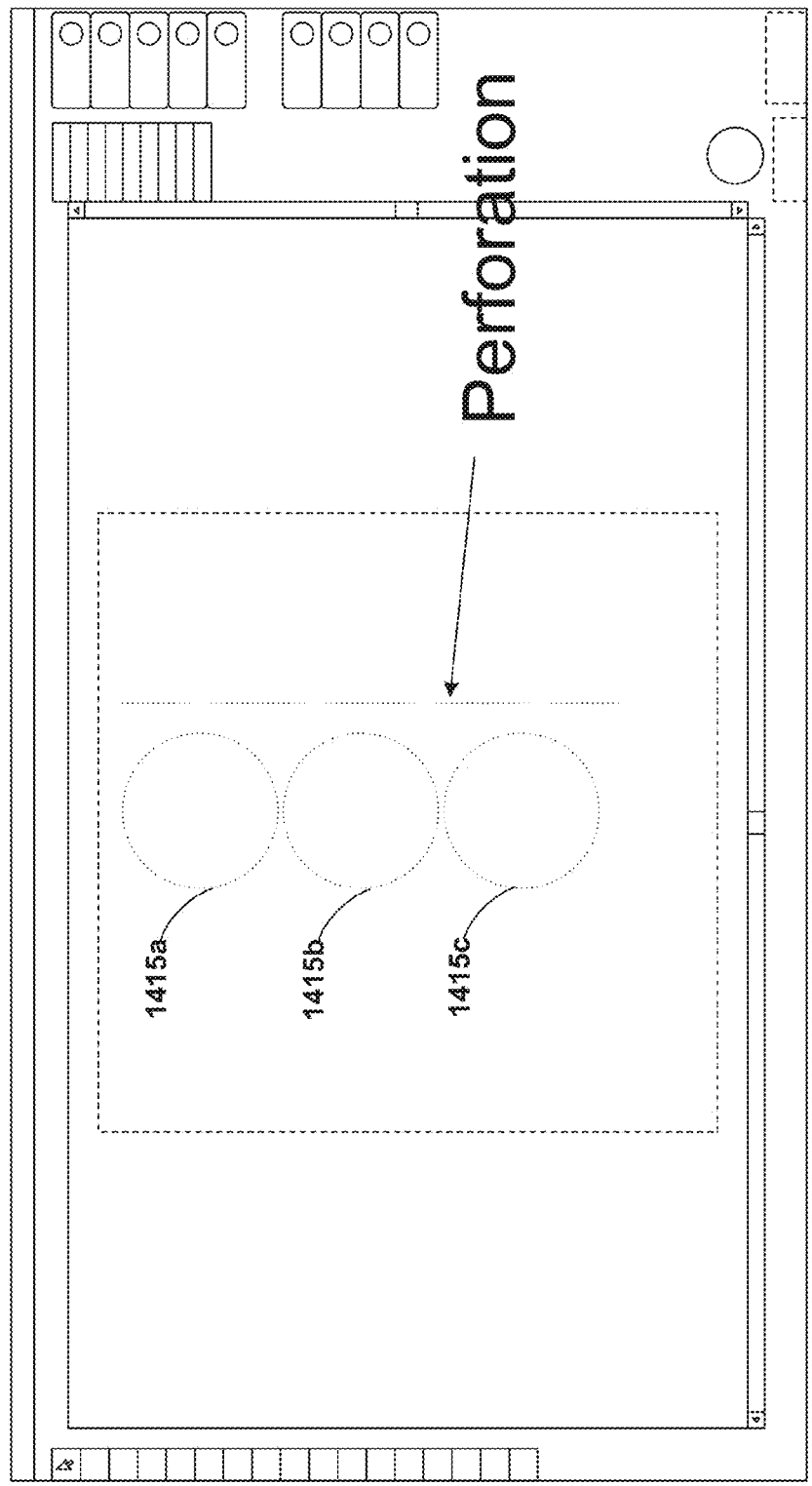
FIG. 14 is a screenshot of a user interface for laser assignment and perforation as may be implemented in some embodiments.

FIG. 14 is a screenshot of a user interface for laser assignment and perforation information 1415a-c as may be implemented in some embodiments.

Figure 15:
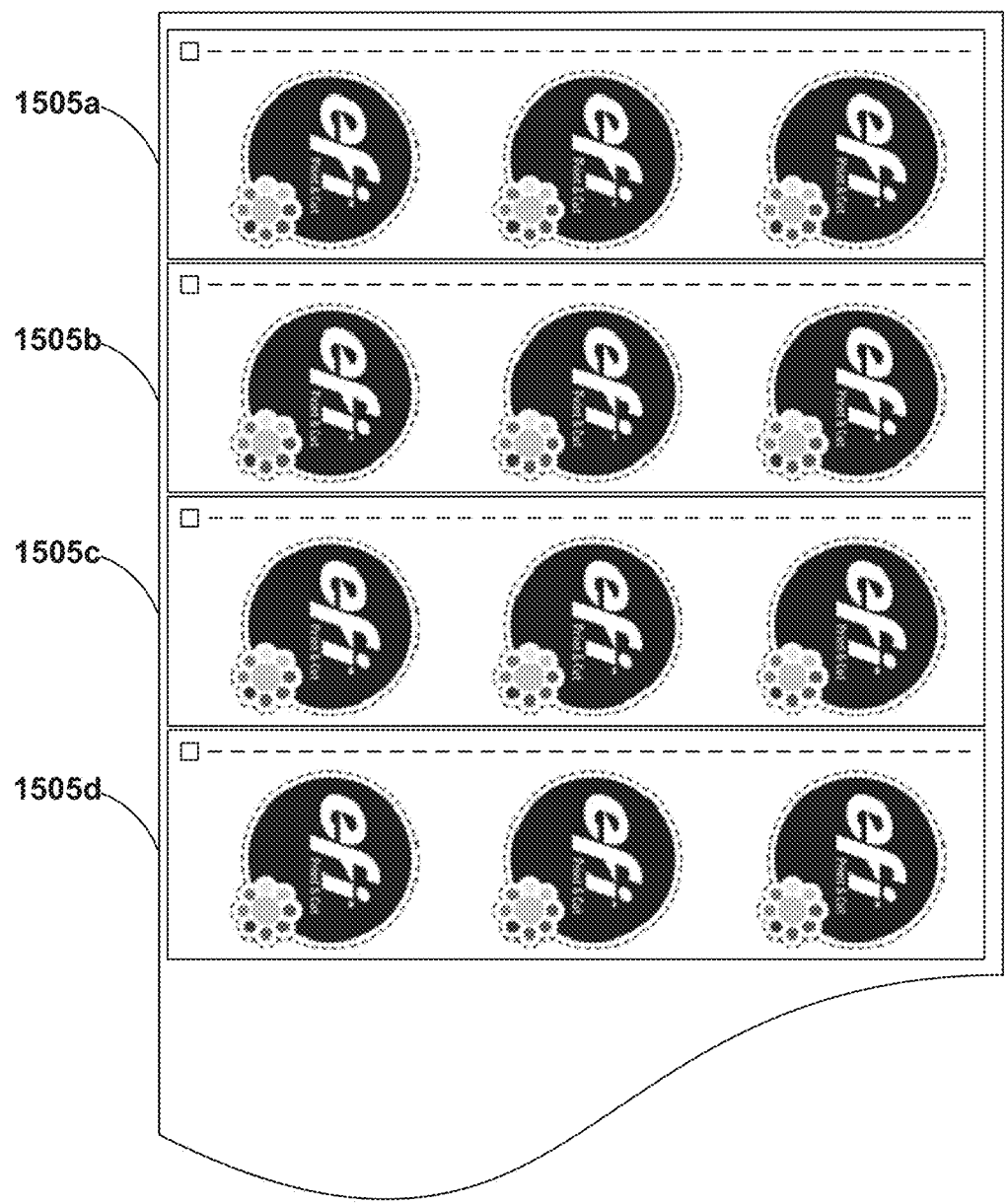
FIG. 15 illustrates perforation patterns as may be applied to a group of images in some embodiments.

FIG. 15 illustrates perforation patterns 1505a-d as may be applied to a group of images in some embodiments. Each row may be cut by a single laser to eliminate joins. The cut speed may be approximately 15 meters per minute in some embodiments.

Communication Workflow

Figure 16:
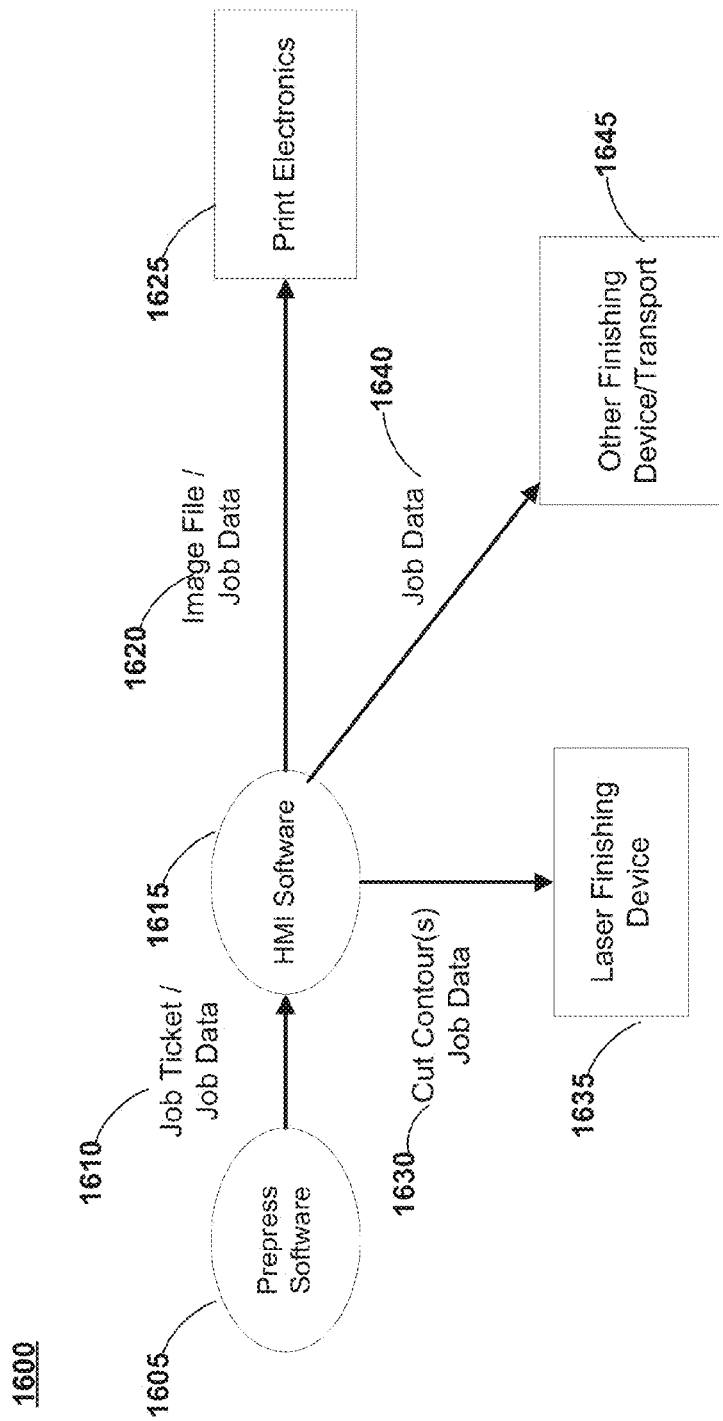
FIG. 16 is a block diagram depicting relationships between various operations, components, and software as may be implemented in some embodiments.

FIG. 16 is a block diagram depicting relationships between various operations, components, and software as may be implemented in some embodiments. A computer running prepress software 1605, e.g. EFI Fiery® XF software, may be used to generate job data 1610, automatically or via user direction. The data 1610 may be provided to Human Machine Interface (HMI) software 1615. Job data 1610 may consist of the printed image and any other information necessary for an inline finishing application. The prepress software may generate: images to print through a RIP process; job parameter info; laser finishing cut profiles/contours; etc. Registration marks may be generated with the job ticket in prepress software. In some embodiments, the registration marks may also be created in the HMI software for flexibility.

As one example, the job data from the prepress software to the HMI system may include: 3 job files and 1 job queue file. The first file may include an image file (e.g., a tiff image), the second file may include an individual job parameter file (e.g., an XML file), the third file may include an individual job contour cut path and the fourth job file may include queue information.

The second file may include details regarding the maximum transport speed; the minimum print speed; the new core request; the number of labels to be printed (copy count); optional items: length per roll, the max number of labels per roll, max diameter of roll, etc. In some embodiments, the file may also indicate a zone divisioning preference (e.g., true, false, auto), a substrate type associated with a library of machine control parameters (e.g., encoder calculations for printing, laser cutting, or other finishing option encoder specifications), registration mark information, number of rows, etc.

The prepress software may store these files in an accessible location. All the files may be contained in what is referred to as a "job thicket" in some embodiments. The HMI software 1615 (e.g., Mercury HMI®) may contain a job queue for automated printing and finishing. A job ticket containing the job data once loaded into the job queue in the HMI, can then be selected for operation from the HMI. Each job ticket may be generated in the prepress software with all relevant parameters such as image, cut shape and desired quantity. These parameters can be loaded into the HMI job queue. Once all jobs are loaded in the queue the correct sequence of execution can be selected by the operator. This could be sorted based on priority, material or other relevant criteria.

The HMI software 1615 may extract the relevant information from the data 1610, and provide cut contour data 1630, to laser finishing device 1635. The software 1615 may also provide job data 1640 to finishing devices 1645. In some embodiments, this may include two files, a first indicating job parameters (e.g. in XML format) and a second file indicating contour cut path parameters (e.g. in XML format). The software 1615 may also provide the image file data 1620 to the print electronics 1625.

Computer System Overview

Figure 17:
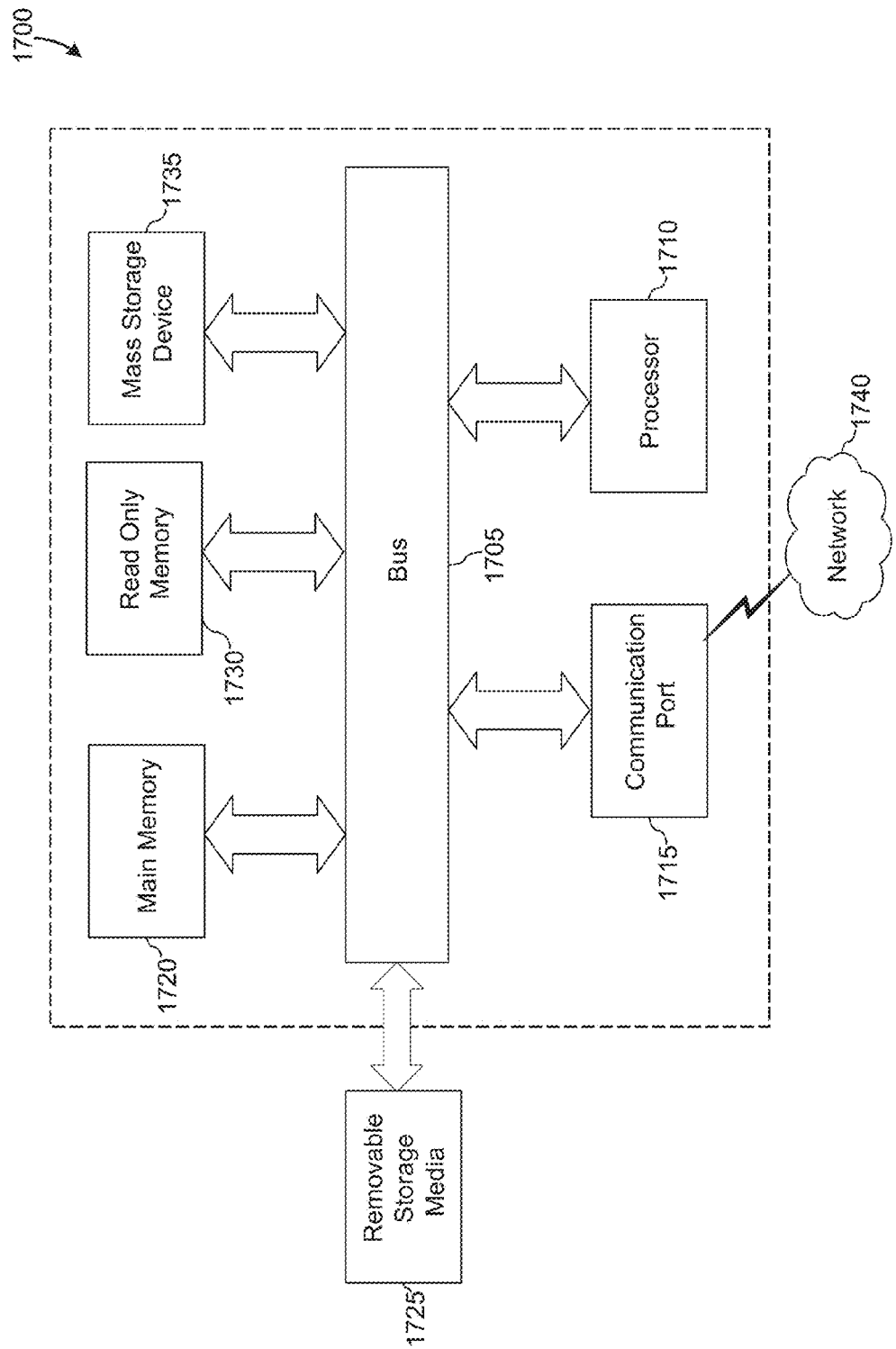
FIG. 17 is a block diagram of a computer system as may be used to implement features of some of the embodiments.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 17 is a block diagram of a computer system 1700 as may be used to implement features of some of the embodiments. Various of the disclosed features may be located on computer system 1700. According to the present example, the computer system includes a bus 1705, at least one processor 1710, at least one communication port 1715, a main memory 1720, a removable storage media 1725, a read only memory 1730, and a mass storage 1735.

Processor(s) 1710 can be any known processor, such as, but not limited to, an Intel® Itanium® or Itanium 2® processor (s), or AMD® Opteron® or Athlon MP® processor(s), or Motorola® lines of processors. Communication port(s) 1715 can be any of an RS-232 port for use with a modem based dialup connection, a 10/100 Ethernet port, or a Gigabit port using copper or fiber. Communication port(s) 1715 may be chosen depending on a network such a Local Area Network (LAN), Wide Area Network (WAN), or any network to which the computer system 1700 connects, including wireless networks.

Main memory 1720 can be Random Access Memory (RAM), or any other dynamic storage device(s) commonly known in the art. Read only memory 1730 can be any static storage device(s) such as Programmable Read Only Memory (PROM) chips for storing static information such as instructions for processor 1710.

Mass storage 1735 can be used to store information and instructions. For example, hard disks such as the Adaptec® family of SCSI drives, an optical disc, an array of disks such as RAID, such as the Adaptec family of RAID drives, or any other mass storage devices may be used.

Bus 1705 communicatively couples processor(s) 1710 with the other memory, storage and communication blocks. Bus 1705 can be a PCI/PCI-X or SCSI based system bus depending on the storage devices used.

Removable storage media 1725 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM).

The components described above are meant to exemplify some types of possibilities. In no way should the aforementioned examples limit the scope of the invention, as they are only suitable embodiments.

Remarks

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" may also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure. For example, although various steps have been discussed in certain of the flow diagrams, one will recognize that additional steps may be performed or depicted steps omitted to accomplish similar functionality. In some instances optional elements may be indicated by dashed outlines in the flow diagrams, whereas in other elements the optionality may be explicitly stated in the text. One will recognize that many process steps not explicitly indicated as being optional may also be optional depending upon the context. The illustrated example flow diagrams are provided for purposes of explanation rather than as limiting depiction of one or more embodiments. Accordingly the depicted steps are illustrative.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

What is claimed is:

1. A computer-implemented method for reducing unprinted material in a printing system comprising:
    determining that a first image sequence being printed on a substrate material in the printing system is complete;
    in response to the determination, accumulating substrate material at an accumulator component, the accumulator component configured to receive substrate material after a print head component and before a finishing component; and
    returning the accumulated material past a cure lamp and the print head such that a final image of the first image sequence resides at a location prior to the printhead.

2. The computer-implemented method of claim 1, wherein the accumulation component redirects the path of the substrate material one or more times.

3. A computer-implemented method for aligning printed images with finishing hardware in a printer comprising:
    determining a first region between a first image on a substrate material and a border of the substrate material;
    selecting a first position within the first region; and
    generating a first registration mark at the first position, the first registration mark configured to be read by a sensor.

4. The computer-implemented method of claim 3, further comprising: calibrating a finishing component based upon the first registration mark.

5. The computer-implemented method of claim 4, wherein the finishing component comprises a cutting component.

6. The computer-implemented method of claim 4, wherein the finishing component comprises a labeling component.

7. The computer-implemented method of claim 4, wherein the second registration mark is larger than the first registration mark.

8. The computer-implemented method of claim 4, further comprising determining, in conjunction with a finishing component, that a job is complete based in part upon the second registration mark.

9. The computer-implemented method of claim 3, further comprising:
    determining that a second image on the substrate material is associated with different finishing parameters from the first image;
    determining a second region between the second image on the substrate material and a border of the substrate material;
    selecting a second position within the second region; and
    generating a second registration mark at the second position, the second registration mark configured to be read by a sensor.

* * * * *